United States Patent
Beardsley

(10) Patent No.: US 7,874,142 B2
(45) Date of Patent: Jan. 25, 2011

(54) AEROENGINE THRUST REVERSER

(75) Inventor: Peter K Beardsley, Derby (GB)

(73) Assignee: Rolls Royce PLC, London (GB)

( * ) Notice: Subject to any disclaimer, the term of this patent is extended or adjusted under 35 U.S.C. 154(b) by 962 days.

(21) Appl. No.: 11/715,367

(22) Filed: Mar. 8, 2007

(65) Prior Publication Data

US 2007/0234707 A1 Oct. 11, 2007

(30) Foreign Application Priority Data

Apr. 7, 2006 (GB) ................................ 0606982.7

(51) Int. Cl.
F02K 3/02 (2006.01)

(52) U.S. Cl. .............. 60/226.2; 244/110 B; 239/265.29
(58) Field of Classification Search ................ 60/226.2, 60/230, 226.1, 262, 770, 771; 239/265.29; 244/110 B See application file for complete search history.

(56) References Cited

U.S. PATENT DOCUMENTS

| | | | | |
|---|---|---|---|---|
| 3,262,271 A | * | 7/1966 | Beavers | 60/226.2 |
| 3,601,992 A | * | 8/1971 | Maison | 60/226.2 |
| 3,779,010 A | * | 12/1973 | Chamay et al. | 60/226.2 |
| 4,825,648 A | * | 5/1989 | Adamson | 60/226.1 |
| 4,960,243 A | * | 10/1990 | Dubois et al. | 239/265.29 |
| 5,157,915 A | * | 10/1992 | Bart | 60/797 |
| 5,778,659 A | * | 7/1998 | Duesler et al. | 60/226.1 |
| 5,806,302 A | * | 9/1998 | Cariola et al. | 60/204 |
| 6,845,946 B2 | * | 1/2005 | Lair | 244/110 B |
| 6,895,742 B2 | * | 5/2005 | Lair et al. | 60/226.2 |
| 2002/0124550 A1 | * | 9/2002 | Stretton | 60/226.2 |
| 2006/0288688 A1 | * | 12/2006 | Lair | 60/226.2 |
| 2009/0321561 A1 | * | 12/2009 | Andre et al. | 244/110 B |

FOREIGN PATENT DOCUMENTS

GB 1 276 265 6/1972

* cited by examiner

Primary Examiner—William H Rodríguez
(74) Attorney, Agent, or Firm—Oliff & Berridge, PLC

(57) ABSTRACT

A gas turbine engine comprising a bypass duct defined radially outwardly by a nacelle and radially inwardly by a core engine casing. The nacelle comprises a thrust reverser unit having at least one blocker door rotatably attached to a static part and slidably connected to a translating part. The translating part is arranged to move between a stowed position and a deployed position and in the deployed position the blocker door spans the bypass duct. In the stowed position the blocker door is stowed inside the translating part and does not form part of an airwash surface of the bypass duct.

18 Claims, 4 Drawing Sheets

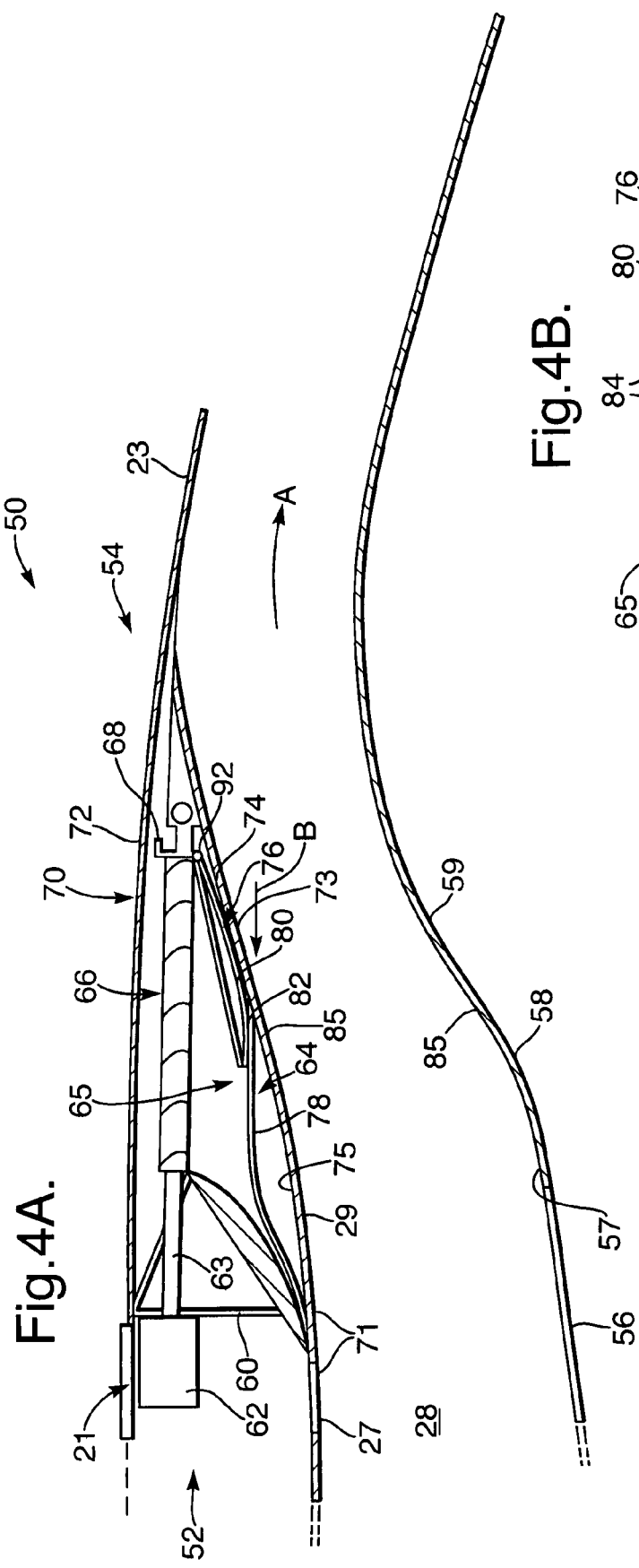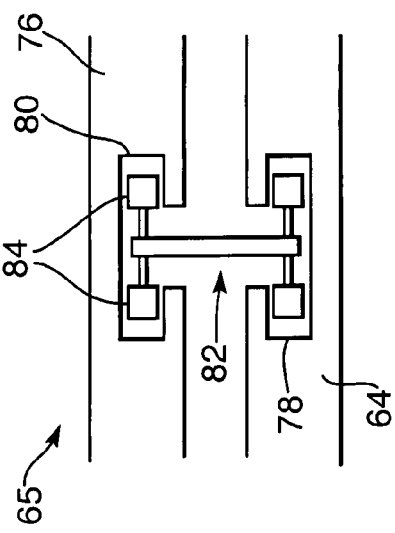

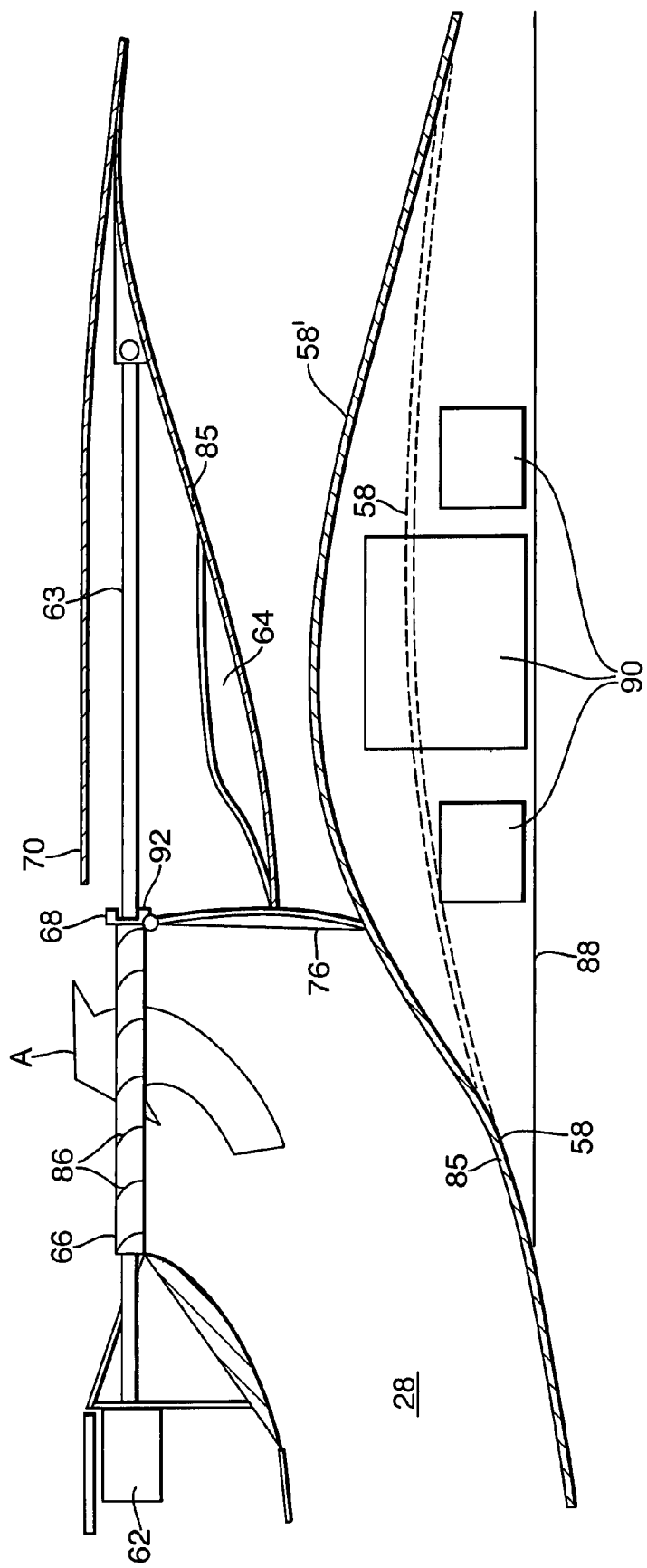

AEROENGINE THRUST REVERSER

The present invention relates to a thrust reverser unit of an aeroengine nacelle and in particular to providing an improved mechanism for stowing and deploying the thrust reverser.

Some conventional aeroengine nacelles comprise a thrust reverser unit (TRU) at their downstream end that is deployable during the landing phase of an associated aircraft. The TRU comprises an airflow turning cascade box and a translating part, which when translated aft causes a mechanism to draw blocker doors across a fan bypass duct and expose the cascade to the fan airflow, thereby producing reverse thrust.

Two prior art thrust reverser units are described in detail in the description. However, in each case some part of the deployment mechanisms or blocker doors protrudes into or forms part of the bypass duct. Typically, acoustic panels line the bypass duct to attenuation engine noise. In each of the prior art designs the acoustic panels comprise cut-outs for hinges, blocker doors, drag links and joins, particularly axially extending joins, which cause undesirable acoustic discontinuities and which disturb the airflow causing aerodynamic losses.

Therefore it is an object of the present invention to provide a TRU that improves acoustic attenuation and reduces aerodynamic losses.

In accordance with the present invention a gas turbine engine comprises a bypass duct defined radially outwardly by a nacelle and radially inwardly by a core engine casing, the nacelle comprises a thrust reverser unit having a static part and a translating part, the thrust reverser unit further comprises at least one blocker door rotatably attached to the static part and slidably contacts the translatable part, the translatable part is arranged to move between a stowed position and a deployed position, in the deployed position the blocker door spans the bypass duct, characterised in that in the stowed position the blocker door is stowed inside the translating part.

Preferably, the translating part comprises a translating sleeve formed by an outer cowl and an inner cowl and in the stowed position the blocker door is disposed between the outer cowl and the inner cowl.

Preferably, in the stowed position the blocker door does not form part of an airwash surface of the bypass duct.

Preferably, in the stowed position the inner cowl forms part of an airwash surface of the bypass duct.

Optionally, the bypass duct is further defined radially outwardly by a fan casing and in the stowed position the fan casing and the inner cowl abut one another to form an airwash surface of the bypass duct.

Preferably, the translating part comprises a slider ramp, the slider ramp is positioned on a radially outer surface of the inner cowl and is in slidable contact with the blocker door. The slidable contact is a rolling or slidable attachment. Preferably, the rolling or slidable attachment comprises a slide member that runs in guides defined on the slider ramps and blocker doors respectively. Preferably, the slide member comprises wheels or slidable pads which run either in the guides.

Preferably, a resilient member is provided between the blocker door and the static part, the resilient member is arranged to provide a force between the blocker door and the translatable part.

Normally, the translating assembly is connected to an actuator via a link rod.

Normally, the static structure comprises a cascade box and in the deployed position the cascade box is exposed to airflow passing through the bypass duct.

Alternatively, the static structure comprises a cascade support ring.

Preferably, the blocker doors are rotatably mounted to either the cascade box or the support ring.

Preferably, acoustic panels are attached to the translating part and form part of an airwash surface of the bypass duct. Preferably, the translating part is housed within a C-shaped duct and the acoustic panels form a complete and continuous airwash surface over the C-shaped duct and do not comprise any acoustic discontinuities.

Preferably, acoustic panels are attached to the core engine casing and form part of an airwash surface of the bypass duct. The acoustic panels form a complete and continuous annulus and do not comprise any acoustic discontinuities.

The present invention will be more fully described by way of example with reference to the accompanying drawings in which:

FIG. 4A is a section through a nacelle comprising a thrust reverser unit in a stowed position in accordance with the present invention;

FIG. 4B is a view on arrow B in FIG. 4 and shows a slidable attachment for use in deployment of the thrust reverser;

FIG. 5 is a section through a nacelle comprising a thrust reverser unit in a deployed position in accordance with the present invention.

Figure 1:
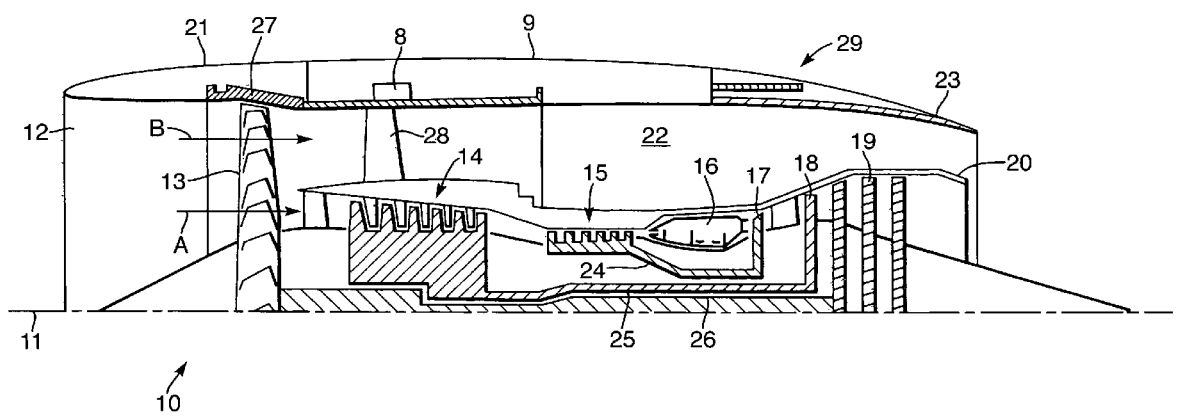
FIG. 1 is a schematic section of part of a ducted fan gas turbine engine incorporating the present invention.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 24, 25, 26.

The fan 13 is circumferentially surrounded by a structural member in the form of a fan casing 27, which is supported by an annular array of outlet guide vanes 28.

A thrust reverser unit 29 is disposed within the nacelle 21 at its downstream end. The thrust reverser 29 is usually deployed during the landing phase of the aircraft to help reduce stopping distance of the aircraft. The thrust reverser is deployable such that a substantial portion of the bypass duct is blocked and the bypass airflow is directed forwardly.

The nacelle 21 comprises two generally C-shaped ducts 9 that each comprises a thrust reverser unit 29. The C-shaped ducts 9 are rotatably mounted to an engine pylon which connect the engine to a wing or a fuselage of an aircraft. During maintenance of the engine or its accessories 8, mounted on the fan casing 27 or core engine, the C-shaped ducts 9 are swung open in a conventional manner. When closed the C-shaped ducts 9 may form either two generally C-shaped bypass ducts 22, having a bifurcation wall a bottom dead centre of the engine, or an annular bypass duct 22.

Figure 2:
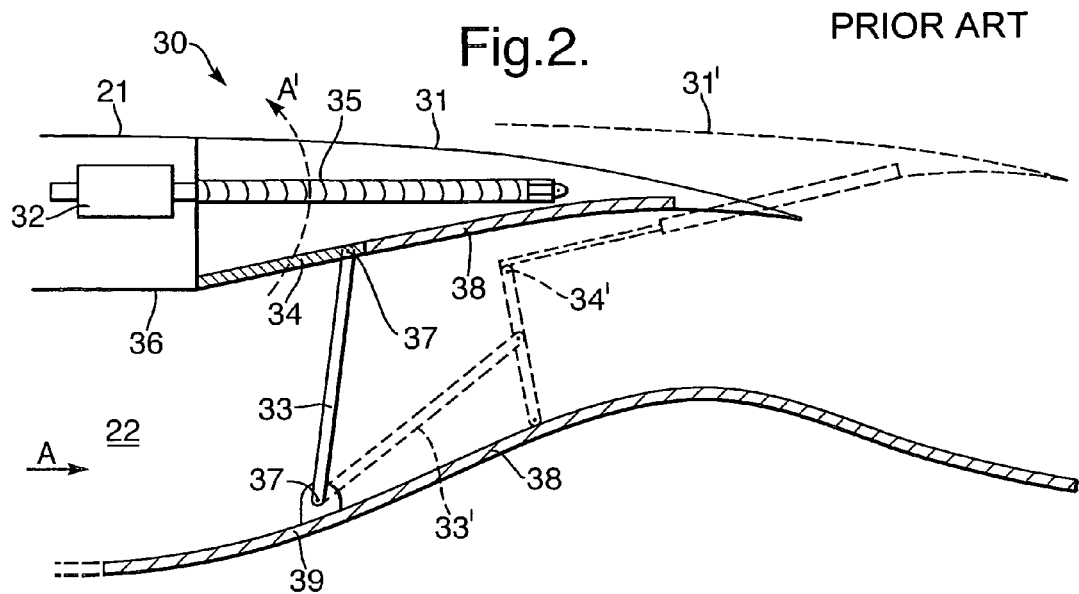
FIG. 2 is a section through a first prior art nacelle comprising a thrust reverser unit.

Referring to FIG. 2, this first prior art thrust reverser system 30 comprises a translatable sleeve 31 moveable between a stowed position (31) and a deployed position (31'). A motor 32 housed in the nacelle 21 is drivingly connected to the translatable sleeve 31. The thrust reverser 30 comprises drag links 33 (33') which are rotatably connected between blocker doors 34 and an inner wall 39 of the bypass duct 22. Moving the translatable sleeve 31 between the stowed 31 and deployed 31' positions the drag links 33 pull the blocker doors 34 between their stowed 34 and deployed 34' positions while also exposing a cascade structure 35 so that bypass air flow A is redirected through the cascade structure 35', where further turning of the airflow A' occurs and therefore provides reverse thrust.

One disadvantage of this prior art design is that the drag links 33 span across the bypass duct 22 during most engine operations and therefore cause significant aerodynamic loss and consequently increasing fuel consumption. A second disadvantage is that the blocker doors 34 form part of the radially outer bypass duct 22 airflow washed surface 36. This means that there are axially extending joins between the circumferentially spaced blocker doors 34 and circumferential joins between the remaining structure of the outer surface 36. Despite sealing, the circumferential joins cause airflow disturbances leading to further aerodynamic losses. Further aerodynamic losses occur around hinges 37 of the drag links 34. A third disadvantage is that all the joins and the hinges result in a loss of bypass wall area that is usable for acoustic treatment. This is particularly important as steps and gaps between sections and the hinges can cause engine noise to be scattered into different modes that are less well attenuated by acoustic liners 38, which are designed for a relatively narrow noise band.

Figure 3A:
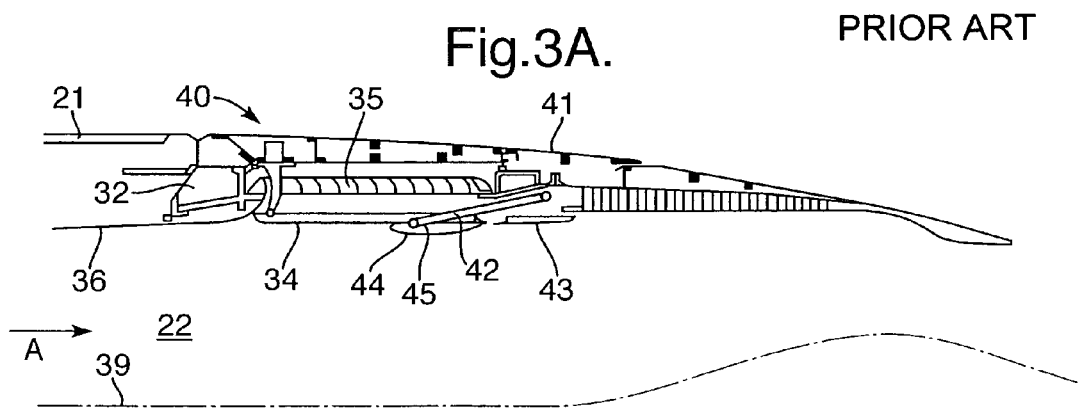
FIGS. 3A and 3B are sections through a second prior art nacelle comprising a thrust reverser unit in stowed and deployed positions respectively.
Figure 3B:
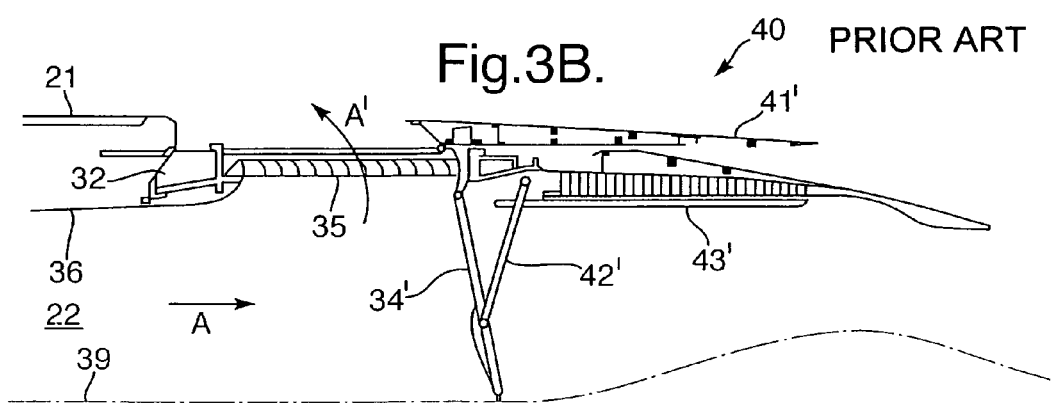

Referring to FIGS. 3A and 3B where like components have the same reference numbers used hereinbefore, this second prior art thrust reverser system 40 comprises a translatable cowl 41 (and corona 43) moveable between a stowed position (41) and a deployed position (41'). Blocker doors 34 are rotatably mounted at their forward end to the translatable cowl 41 and rearwardly to drag links 42. The drag links 42 are rotatably mounted to a fixed part of the nacelle 21. Thus when the translatable cowl 41 moved between the stowed (FIG. 3A) and deployed (FIG. 3B) positions (41, 41') the cascade structure 35 is exposed and the blocker doors 34 block the bypass to direct airflow A through the cascade structure 35 forwardly to provide reverse thrust.

Although the drag links 42 are "hidden" away from the airflow A, radially outwardly between the translating cowling 41 and the corona 43, the blocker doors 34 still form part of the outer bypass duct surface 36. One disadvantage of this prior art design is that the blocker doors 34 form part of the radially outer bypass duct 22 airflow washed surface 36. This means that there are joins between the blocker doors 34 and remaining structure of the outer surface 36 which despite sealing causes airflow disturbances leading to further aerodynamic losses. Whereas aerodynamic losses are minimised around hinges 37 of the drag links 34 by bumps 44, the design is disadvantaged as the axial joins and the hinges result in a loss of bypass wall area that is usable for acoustic treatment. This is particularly important as steps and gaps between sections and the hinges can cause engine noise to be scattered into different modes that are less well attenuated by acoustic liners 38, which are designed for a relatively narrow range of noise bands.

Referring now to FIG. 4A, the thrust reverser unit (TRU) 50 is part of the nacelle 21 and is housed within two C-shaped and openable ducts (9) similar to those surrounding conventional Rolls-Royce plc Trent® aeroengines and briefly described herein with reference to FIG. 1. The TRU C-shaped ducts 9 each comprise fixed and translating assemblies 52, 54. The fixed assembly 52 is attached to the rear of the fan casing 27 and comprises a forward bulkhead 60, an actuator 62, a slider system 64, hinges and latches for opening the C-shaped ducts (not shown), a cascade box 66 and the aft cascade ring 68.

The translating assembly 54 comprises a translating sleeve 70 having an outer cowl 72 and an inner cowl 73. The translating assembly 54 is drivingly connected to the actuator 62 via a link rod 63, which in this exemplary embodiment passes through the cascade 66. Preferably there are two actuators 62 per C-shaped duct 9.

The bypass duct 22 is therefore defined between the radially inner fixed bypass wall 58 and a radially outer bypass wall 74. The radially outer bypass wall 74 comprises an airwash surface 29 and is formed by the fan casing 27 and the inner cowl 73. The radially inner fixed bypass wall 58 comprises a core engine casing 56 connected to an inner fixed structure 59; thereby defining an inner bypass airwash surface 57.

Blocker doors 76 are arranged in an annular array around the nacelle 21, and each is rotatably attached at one end to the rear of the cascade 66 or can be attached to the cascade ring 68. At their other end the blocker doors 76 are in slidable contact 65 to a slider ramp 64 located on within the translating sleeve 70. In this preferred embodiment, the slider ramp 64 is positioned on a radially outer surface 75 of the inner cowl 73. In this embodiment there are six blocker doors 76 and six slider ramps 64 and each are positioned in an annular array when the C-shaped ducts are closed. It should be appreciated that more or less than six blocker doors 76 or slider ramps 64 per C-shaped duct 9 may be used dependent on the size of blocker door and/or duct. Furthermore the number of slider ramps 64 may be more or less that the number of blocker doors 76, for example each slider ramp 64 may comprise guides 78 for an adjacent blocker door 76 or there may be a continuous slider ramp around each C-shaped duct 9.

The slidable contact is a slidable attachment 65 which comprises guides 78, 80 on the slider ramps 64 and blocker doors 76 and a slide member 82 which can be seen more clearly in FIG. 4B. The slide member 82 slidably connects the slider ramps 64 and blocker doors 76 together. The slide member 82 comprises wheels 84 that run in the guides 78, 80, alternatively low friction pads 84 may be used instead of the wheels 84 and the pads 84 may run either in the guides 78, 80 or simply over the profiled surface of the slider ramp 64.

When in a stowed position, as seen in FIG. 4A, the blocker doors 76 are housed inside the translating sleeves 70. Thus in the stowed position the blocker doors 76 do not form part of an airwash surface 29 of the nacelle 21. In this example the airwash surface 29 of the nacelle 21 comprises the airwash surfaces 29 of the fan casing 27 and inner cowl 73 of the translating sleeves 70. When activated for thrust reversing operation as seen in FIG. 5, the actuator 62 receives a command signal and drives the translating sleeve 70 rearward. The slider guides 78, 80 are shaped such that as the translating sleeve 70 moves rearward, the blocker doors 76 are rotated into and substantially block the bypass duct 28. The translation to the deployed position also exposes the cascade 66 (or annular array of cascades) so that bypass airflow A is diverted through the cascade 66, where it is further turned forward by an array of curved vanes 86 providing reverse thrust.

Acoustic panels 85 are attached to the inner cowl 73 and fan casing 27 and form part of the airwash surface 29. The acoustic panels 85 form a complete and continuous annulus and do not comprise any acoustic discontinuities. Similarly, acoustic panels 85 are attached to the core engine casing 56 and form part of an airwash surface 57. Again the acoustic panels 85 form a complete and continuous annulus and do not comprise any acoustic discontinuities. It is an advantage of the present invention that improved acoustic attenuation of engine noise is achieved over the prior art designs because the TRU 50 has a blocker door system which is stowed within the translating sleeve 70 and therefore there are no acoustic discontinuities such as cut-outs in the acoustic liners for hinges, blocker doors 76 or other joins to disturb the airflow and cause aerodynamic losses. As there are no cut-outs in the acoustic liners 85, lining the bypass duct 28 is relatively simple and the liners are easier to manufacture. In the stowed position the radially outer bypass wall 74 comprises only one circumferential join, where the fan casing 27 and the inner cowl 73 abut. Thus it is important that this join is aerodynamically smooth.

Fan blade generated noise waves travel rearward and impinge on the acoustic liners. A discontinuity in the acoustic treatment (panels), especially axially extending discontinuities) causes an undesirable amount of noise energy to scatter into different noise modes and is therefore less well attenuated by the remaining downstream acoustic treatment. However, a circumferential join (discontinuity) does not cause such a significant scattering of noise energy. In the prior art designs the axially extending discontinuities between circumferentially adjacent acoustic panels, such as between blocker doors, cause significant scatter of noise.

A further advantage over the FIG. 2 prior art design is that there are no drag links 34 spanning across the bypass duct 22 during most of the flight cycle. The present invention is even advantaged over the FIG. 3 prior art design, which has bumps or protrusions 44 to accommodate drag link/blocker door hinges 45. Thus no acoustic treatment is provided over the bumps 44, and which also cause noise energy to scatter.

The TRU 50 system of the present invention is possible due to having a greater radial height of the core fairing 58 and rear inner fixed structure 59 than a conventional engine's core fairing 58'. The greater radial height is advantageous in that more and larger engine accessories 90 may be mounted to a core engine casing 88, requiring more space. The increased radial height of the core fairing 58 and rear inner fixed structure 59 is further advantageous as noise generated from the fan 13, in the form of pressure waves, impinges directly on the acoustic liners 85, rather than the noise having a clear line-of-sight out of the nozzle 23.

To assist the blocker doors 76 deploying a resilient member 92, in this case a spring, is provided at the hinge interface at the aft end of the cascade box 66. The spring 92 attachment forces the blocker doors 76 to the deployed position. The provision of a resilient member 92 is preferred as it provides a positive force to hold the blocker door 76 against the slider ramp so that aerodynamic forces do not cause the blocker door 76 to vibrate or flap during operation. Furthermore, where a particularly robust resilient member 92 is used one or both the guides 78, 80 may be omitted and the blocker doors 76 simply roll or slide over the outer surface of the slider ramp 64.

When fully deployed the gas pressure loading onto the blocker doors 76 is reacted via the hinge 92 into the aft cascade ring 68 and via the slidable attachment 65 on the blocker door 76 into the translating sleeve 70.

An additional advantage to each of the prior art designs is that the blocker doors 76 are attached to the cascade box 66 or other fixed structure like the ring 68, rather than to a translating part of the thrust reverser unit. This arrangement reduces the weight of the structure being translated, which in turn reduces the weight of the slider and actuation systems.

The invention claimed is:

1. A gas turbine engine having a core engine casing, and being surrounded by a nacelle that defines a bypass duct, the bypass duct being defined radially outwardly by the nacelle and radially inwardly by the core engine casing, the nacelle including a thrust reverser unit, the thrust reverser unit comprising:
   a static part and a translating part;
   a slider ramp located on the translating part; and
   at least one blocker door rotatably attached to the static part and in slideable contact with the translating part, the translating part being arranged to move between a stowed position and a deployed position, in the deployed position the blocker door spans the bypass duct, wherein the at least one blocker door is in slideable contact with the slider ramp located on the translating part.

2. The gas turbine engine of claim 1, wherein the translating part has a translating sleeve formed by an outer cowl and an inner cowl, and in the stowed position, the blocker door is disposed between the outer cowl and the inner cowl.

3. The gas turbine engine of claim 1, wherein in the stowed position the blocker door does not form part of an airwash surface of the bypass duct.

4. The gas turbine engine of claim 2, wherein in the stowed position the inner cowl forms part of an airwash surface of the bypass duct.

5. The gas turbine engine of claim 3, wherein the bypass duct is further defined radially outwardly by a fan casing and in the stowed position the fan casing and the inner cowl abut one another to form an airwash surface of the bypass duct.

6. The gas turbine engine of claim 1, wherein the slider ramp is positioned on a radially outer surface of the inner cowl.

7. The gas turbine engine of claim 6, wherein the slideable contact is a rolling or slideable attachment.

8. The gas turbine engine of claim 7, wherein the slideable attachment includes a slide member that runs in guides defined on the slider ramps and blocker doors respectively.

9. The gas turbine engine of claim 8, wherein the slide member includes wheels or slideable pads which run in the guides.

10. The gas turbine engine of claim 1, wherein a resilient member is provided between the blocker door and the static part, the resilient member is arranged to provide a force between the blocker door and the translatable part.

11. The gas turbine engine of claim 1, wherein the translating assembly is connected to an actuator via a link rod.

12. The gas turbine engine of claim 1, wherein the static structure includes a cascade box and in the deployed position the cascade box is exposed to airflow passing through the bypass duct.

13. The gas turbine engine of claim 12, wherein the static structure includes a cascade support ring.

14. The gas turbine engine of claim 12, wherein the blocker doors are rotatably mounted to either the cascade box or the support ring.

15. The gas turbine engine of claim 1, wherein acoustic panels are attached to the translating part and form part of an airwash surface of the bypass duct.

16. The gas turbine engine of claim 15, wherein the translating part is housed within a C-shaped duct and the acoustic panels form a complete and continuous airwash surface over the C-shaped duct and do not have any acoustic discontinuities.

17. The gas turbine engine of claim 1, wherein acoustic panels are attached to the core engine casing and form part of an airwash surface of the bypass duct.

18. The gas turbine engine of claim 17, wherein acoustic panels form a complete and continuous annulus and do not comprise any acoustic discontinuities.

* * * * *